United States Patent
Ohtomo

(10) Patent No.: US 9,102,238 B2
(45) Date of Patent: Aug. 11, 2015

(54) FAIL STATE DETERMINATION APPARATUS FOR ELECTRIC VEHICLE CHARGING SYSTEM

(71) Applicant: Fuji Jukogyo Kabushiki Kaisha, Tokyo (JP)

(72) Inventor: Yosuke Ohtomo, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 13/670,336

(22) Filed: Nov. 6, 2012

(65) Prior Publication Data

US 2013/0127413 A1    May 23, 2013

(30) Foreign Application Priority Data

Nov. 18, 2011    (JP) .................................. 2011-252719

(51) Int. Cl.
| | |
|---|---|
| H02J 7/00 | (2006.01) |
| B60L 3/04 | (2006.01) |
| B60L 3/00 | (2006.01) |
| B60L 7/14 | (2006.01) |
| B60L 11/18 | (2006.01) |

(52) U.S. Cl.
CPC . *B60L 3/04* (2013.01); *B60L 3/003* (2013.01); *B60L 7/14* (2013.01); *B60L 11/1803* (2013.01); *B60L 11/185* (2013.01); *B60L 11/1816* (2013.01); *B60L 11/1825* (2013.01); *B60L 11/1877* (2013.01); *B60L 2210/14* (2013.01); *B60L 2230/12* (2013.01); *B60L 2230/16* (2013.01); *Y02T 10/7005* (2013.01); *Y02T 10/705* (2013.01); *Y02T 10/7088* (2013.01); *Y02T 10/7225* (2013.01); *Y02T 90/121* (2013.01); *Y02T 90/127* (2013.01); *Y02T 90/128* (2013.01); *Y02T 90/14* (2013.01); *Y02T 90/163* (2013.01)

(58) Field of Classification Search
CPC .................................................. B60L 11/1803
See application file for complete search history.

(56) References Cited

U.S. PATENT DOCUMENTS

| | | | | |
|---|---|---|---|---|
| 4,787,021 | A * | 11/1988 | Hokari et al. | 363/37 |
| 7,598,703 | B2 * | 10/2009 | Zhang et al. | 320/107 |
| 8,028,780 | B2 * | 10/2011 | Sagawa et al. | 180/65.27 |
| 2007/0023215 | A1* | 2/2007 | Ueda | 180/167 |
| 2009/0079262 | A1* | 3/2009 | Ohtomo | 307/10.6 |
| 2009/0079389 | A1* | 3/2009 | Ohtomo | 320/109 |
| 2009/0096410 | A1* | 4/2009 | Sakurai | 320/104 |
| 2010/0315040 | A1* | 12/2010 | Sakurai | 320/109 |
| 2012/0249069 | A1* | 10/2012 | Ohtomo | 320/109 |

FOREIGN PATENT DOCUMENTS

JP        2010-238576 A    10/2010

* cited by examiner

*Primary Examiner* — Drew A Dunn
*Assistant Examiner* — Steve T Chung
(74) *Attorney, Agent, or Firm* — McGinn IP Law Group, Pllc

(57) ABSTRACT

There are provided an electric charging system and an electric vehicle. The electric vehicle has a battery and is provided with power receiving terminals for charging. A converter is provided between the battery and the power receiving terminals, and relays are provided between the converter and the power receiving terminals. An electric charger is provided with a power converter that outputs charging power and power supply terminals connected to the power converter. When the interruption of charging power supply from the power converter fails during charging, the converter is actuated and the stored electric power of the battery is boosted and supplied to the relays.

20 Claims, 6 Drawing Sheets

FAIL STATE DETERMINATION APPARATUS FOR ELECTRIC VEHICLE CHARGING SYSTEM

CROSS REFERENCE TO RELATED APPLICATIONS

The present application claims priority from Japanese Patent Application No. 2011-252719 filed on Nov. 18, 2011, the entire contents of which are hereby incorporated by reference.

BACKGROUND OF THE INVENTION

1. Field of the Invention

The present invention relates to an electric charging system and an electric vehicle, and, in particular, to a technology that prevents a weld failure or fusion failure of a relay provided to an electric vehicle.

2. Description of the Related Art

In recent years, electric vehicles that are equipped with an electric motor for propulsion have been under development. When an electric storage device such as a battery that is installed at the electric vehicle is charged, a power feed connector extending from an external electric charger is connected to a power receiving connector of the electric vehicle. Furthermore, in the field of hybrid electric vehicles that are equipped with an engine and an electric motor for propulsion, an electric vehicle of the so-called plug-in system, in which an electric storage device is charged with an external electric charger, is under development.

Since a terminal voltage of the electric storage device is applied to the power receiving connector provided to the electric vehicle, it is necessary to ensure safety during a charging operation in which the power receiving connector is exposed. Thus, a relay is provided to a power supply line that connects the electric storage device and the power receiving connector. When the charging operation is not performed, the relay is disconnected, thereby preventing the terminal voltage from being applied to the power receiving connector.

Since a large current is supplied during charging to the relay thus provided on the power supply line, a weld failure or fusion failure may occur. Accordingly, an electric charging system is suggested that switches the relay to a disconnection state after charging is complete as well as monitors a voltage change due to the relay disconnection (see, for example, Japanese Unexamined Patent Application Publication No. 2010-238576). By using such an electric charging system, it is possible to detect a weld failure of the relay.

SUMMARY OF THE INVENTION

However, since the weld failure and fusion failure of the relay that is connected to the electric storage device and power receiving connector are the problems directly related to safety of the electric vehicle, the weld failure and fusion failure should be prevented. Furthermore, the relay that is connected to the electric storage device and power receiving connector is often disposed inside a case where an inverter or the like is housed. Therefore, since a large number of operations are involved in a relay replacement process, the weld failure and fusion failure should be also prevented from the standpoint of repair cost.

It is an object of the present invention to prevent a weld failure and fusion failure of the relay.

An aspect of the present invention provides an electric charging system in which an electric vehicle is provided with a power receiving connector to be connected to an electric storage device, a power supply connector of an electric charger is connected to the power receiving connector, and charging power is supplied from the electric charger to the electric storage device. The electric charging system includes: a relay that is provided between the electric storage device and the power receiving connector and that is switched between a connection state and a disconnection state; a converter that is provided between the electric storage device and the relay and boosts a voltage of an electric power of the electric storage device and supplies the boosted power to the relay; and a fail controller that operates the converter to raise a voltage applied to one end side of the relay and then switches the relay to the disconnection state when interruption of charging power supply from the electric charger fails.

In the electric charging system in accordance with the present invention, the fail controller switches the relay to the disconnection state after an electric current in a current carrying line connecting the electric storage device to the power supply connector becomes less than a predetermined value.

In the electric charging system in accordance with the present invention, the electric vehicle has an inverter that supplies electric power to an electric motor, and when the vehicle runs, the boosted stored electric power is supplied from the converter to the inverter.

Another aspect of the present invention provides an electric vehicle which is provided with a power receiving connector to be connected to an electric storage device and in which a power supply connector of an electric charger is connected to the power receiving connector during charging. The electric vehicle includes: a relay that is provided between the electric storage device and the power receiving connector and that is switched between a connection state and a disconnection state; a converter that is provided between the electric storage device and the relay and boosts a voltage of an electric power of the electric storage device and supplies the boosted power to the relay; and a fail controller that operates the converter to raise a voltage applied to one end side of the relay and then switches the relay to the disconnection state when interruption of charging power supply from the electric charger fails.

In the electric vehicle in accordance with the present invention, the fail controller switches the relay to the disconnection state after an electric current in a current carrying line connecting the electric storage device to the power supply connector becomes less than a predetermined value.

In the electric vehicle in accordance with the present invention, the electric vehicle has an inverter that supplies electric power to an electric motor, and when the vehicle runs, the boosted stored electric power is supplied from the converter to the inverter.

According to the present invention, when the interruption of charging power supply from the electric charger fails, the converter is operated to raise a voltage applied to one end side of the relay, and then the relay is switched to the disconnection state. As a result, the relay can be disconnected after the electric current has been lowered, and the occurrence of a weld failure and fusion failure can be prevented.

DESCRIPTION OF THE PREFERRED EMBODIMENTS

Figure 1:
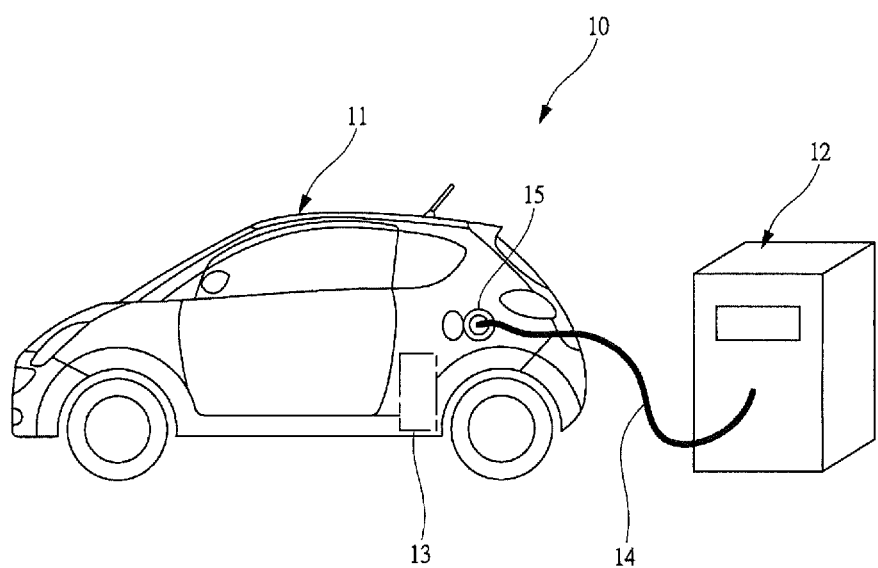
FIG. 1 is an explanatory diagram illustrating charging preformed with an electric charging system according to an embodiment of the present invention.
Figure 2:
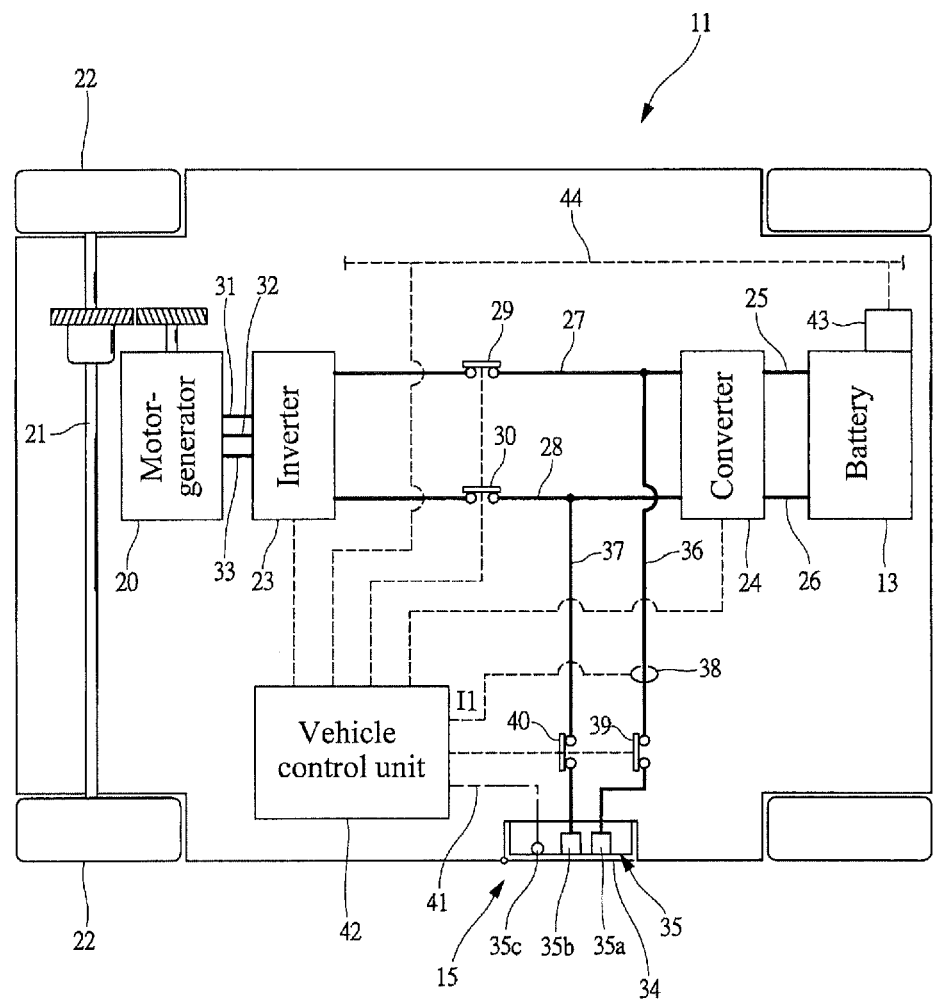
FIG. 2 is a schematic diagram showing an internal structure of an electric vehicle constituting the electric charging system.
Figure 3:
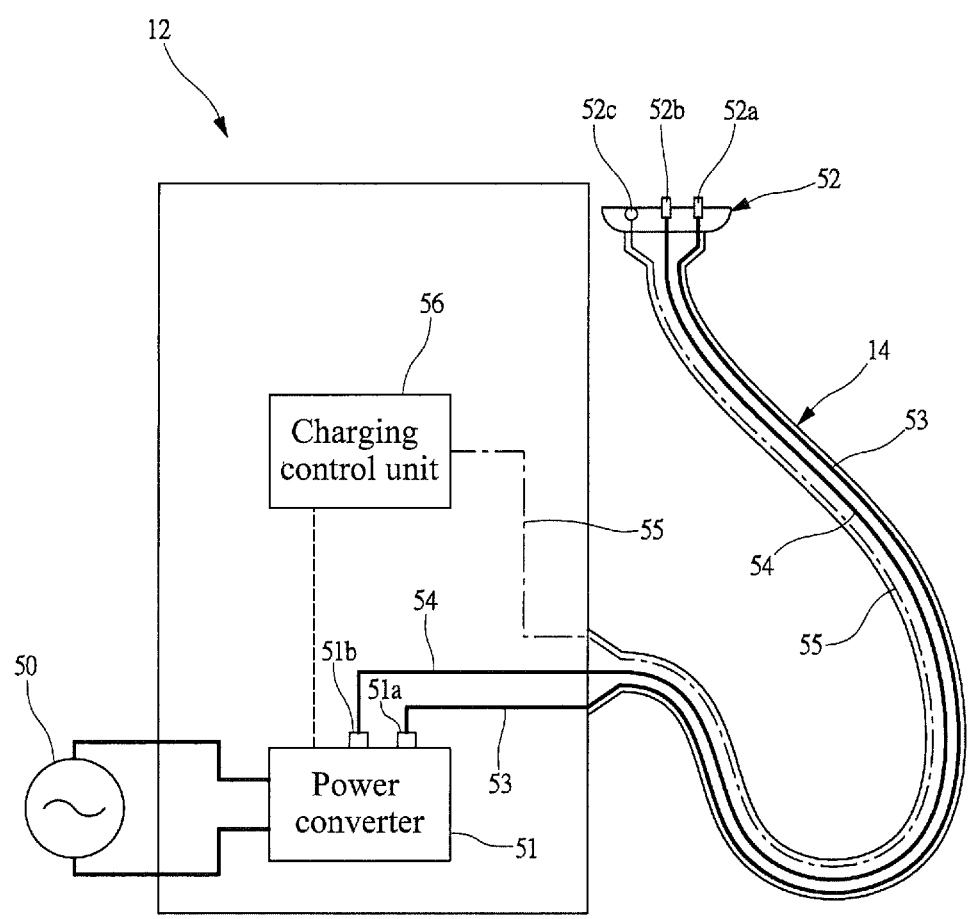
FIG. 3 is a schematic diagram showing an internal structure of an electric charger constituting the electric charging system.

An embodiment of the present invention will hereunder be described with reference to the drawings. FIG. 1 is an explanatory diagram illustrating charging preformed with an electric charging system 10 according to an embodiment of the present invention. FIG. 2 is a schematic diagram showing an internal structure of an electric vehicle 11 constituting the electric charging system 10. FIG. 3 is a schematic diagram showing an internal structure of an electric charger 12 constituting the electric charging system 10. As shown in FIG. 1, the electric vehicle 11 is equipped with a battery 13 as an electric storage device. When the battery 13 is charged, a charging cable 14 of the electric charger 12 is connected to a charging port 15 of the electric vehicle 11.

As shown in FIG. 2, the electric vehicle 11 includes a motor-generator (electric motor) 20 for propulsion. The motor-generator 20 is connected to drive wheels 22 by a drive axle 21. The motor-generator 20 is also connected to the battery 13 by an inverter 23 and a converter 24. The converter 24 that is connected to the battery 13 by a pair of electric power lines 25 and 26 is constituted by an IGBT, a reactor, and a capacitor and can boost in voltage and output the DC power of the battery 13. The inverter 23 is connected by a pair of electric power lines 27 and 28 to the converter 24, and the boosted DC power is supplied from the converter 24 to the inverter 23. The electric power lines 27 and 28 have main relays 29 and 30 respectively. The inverter 23 that is connected by a plurality of electric power lines 31 to 33 to the motor-generator 20 is constituted by an IGBT and a capacitor and can pseudo-generate AC power for motor drive from the DC power. The converter 24 not only boosts the DC power supplied from the battery 13 to the inverter 23, but also lowers the DC power supplied from the inverter 23 to the battery 13 during regeneration. The inverter 23 can also bidirectionally convert the DC power and AC power.

The charging port 15 of the electric vehicle 11 includes a charging lid 34 that is openably and closably disposed at a side of the vehicle body and a power receiving connector 35 that is housed inside the charging lid 34. The power receiving connector 35 has a pair of power receiving terminals 35a and 35b. The power receiving terminal 35a is connected by a power receiving line (current carrying line) 36 to the electric power line 27 at a side of a positive electrode. The power receiving terminal 35b is connected by a power receiving line (current carrying line) 37 to the electric power line 28 at a side of a negative electrode. Thus, the power receiving connector 35 and the battery 13 are connected by the converter 24. A current sensor 38 that measures an electric current I1 is provided to the power receiving line 36. A relay (relay means) 39 is also provided to the power receiving line 36, and a relay (relay means) 40 is provided to the power receiving line 37. Furthermore, the power receiving connector 35 has a signal receiving terminal 35c, and the signal terminal 35c is connected to a communication line 41. The electric vehicle 11 includes a vehicle control unit 42 that controls the inverter 23, the converter 24, and the relays 39 and 40, and a battery control unit 43 that manages charging and discharging of the battery 13. The control units 42 and 43 are connected to each other via a communication network 44. Each of the control units 42 and 43 is equipped with a CPU, a memory and the like.

As shown in FIG. 3, the electric charger 12 has a power converter 51 that generates DC power (charging power) from the AC power of the external power source 50. The power converter 51 includes a rectification circuit, an electric transformer, a switching circuit and the like. An end of the charging cable 14 of the electric charger 12 is provided with a power supply connector 52 that is attachable and detachable with respect to the power receiving connector 35. The power supply connector 52 has a pair of power supply terminals 52a and 52b that correspond to the power receiving terminals 35a and 35b of the power receiving connector 35. The power supply terminal 52a is connected to a positive electrode terminal 51a of the power converter 51 by a power supply line 53, while the power supply terminal 52b is connected to a negative electrode terminal 51b of the power converter 51 by a power supply line 54. Further, the power supply connector 52 is provided with a signal terminal 52c, and the signal terminal 52c is connected to a communication line 55. The electric charger 12 is provided with a charging control unit 56 constituted by a CPU, a memory and the like, and the power converter 51 is controlled by the charging control unit 56.

Figure 4:
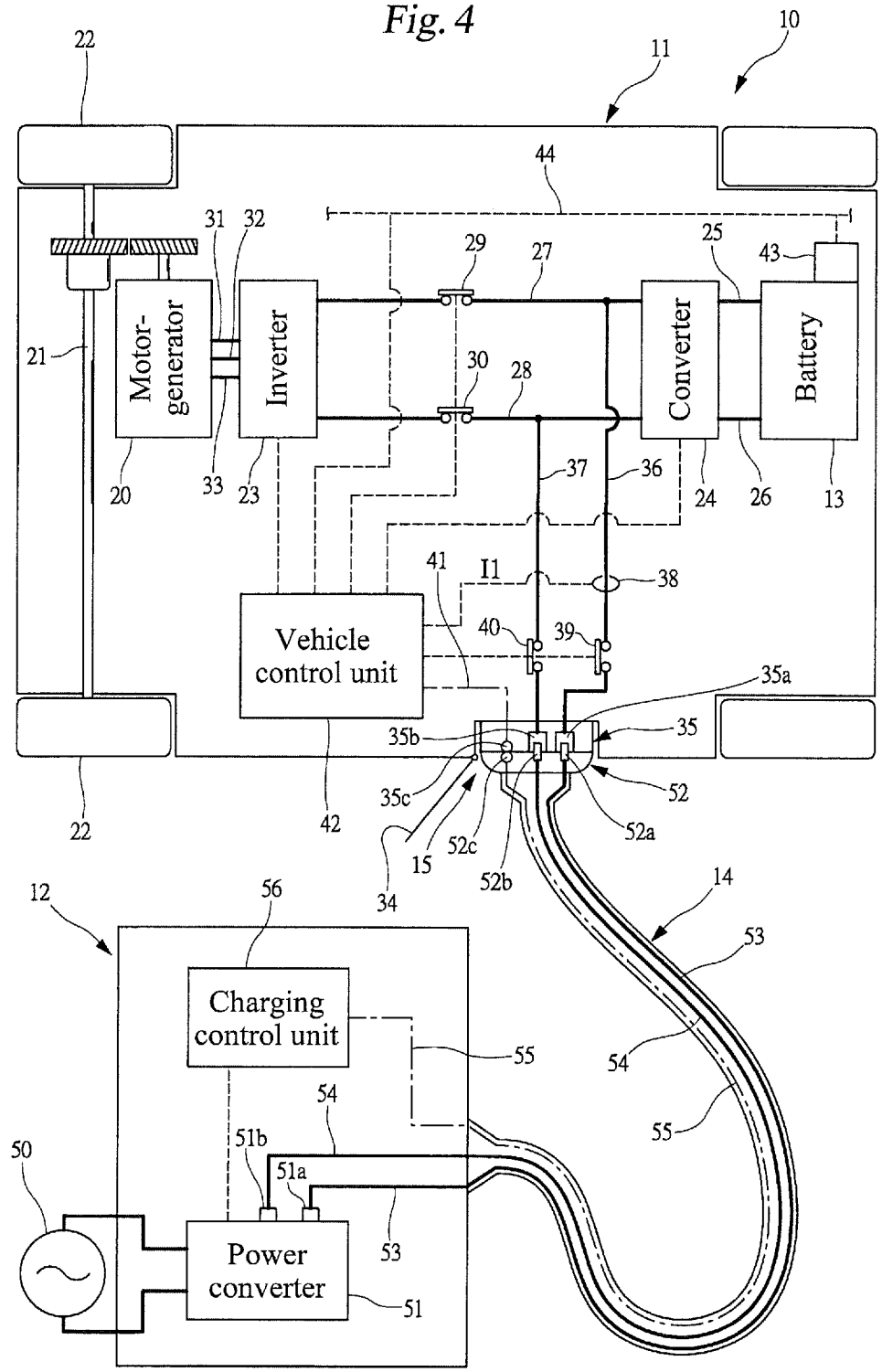
FIG. 4 is a schematic diagram showing a state where the electric charger is connected to the electric vehicle.

FIG. 4 is a schematic diagram showing a state where the electric charger 12 is connected to the electric vehicle 11. As shown in FIG. 4, when the charging cable 14 is connected to the charging port 15, the power receiving connector 35 is exposed by opening the charging lid 34 disposed at the vehicle body, and the power supply connector 52 of the charging cable 14 is connected to the power receiving connector 35. As a result, the power converter 51 is connected to the battery 13 by the power supply lines and power receiving lines 36, 37, 53, and 54, and the vehicle control unit 42 is connected to the charging control unit 56 by the communication lines 41 and 55. Then, the vehicle control unit 42 is used for supplying the charging power, the main relays 29 and 30 are switched to the disconnection state, and the relays 39 and 40 are switched to the connection state. The charging control unit 56 then sets a target voltage (for example, 400 V) corresponding to a target state of charge (SOC) of the battery 13 (for example, 100%) and supplies charging power from the power converter 51 to the battery 13 until the terminal voltage of the battery 13 reaches the target voltage.

In such charging, a large electric current (for example, 100 A) flows in the power receiving lines 36 and 37 and therefore where the relays 39 and 40 are unintentionally switched to the disconnection state or connection state as the charging power is being supplied, it causes a weld failure or fusion failure of the relays 39 and 40. For this reason, when charging is started, the relays 39 and 40 are switched to the connection state before the charging power is outputted from the power converter 51, and when charging is complete, the relays 39 and 40 are switched to the disconnection state after the supply of charging power from the power converter 51 is interrupted. However, since the power converter 51 outputs large charging power, large electromagnetic noise is generated from the power converter 51 during charging, and the charging control unit 56 located inside the electric charger 12 supposedly can malfunction due to this electromagnetic noise. In some cases, depending on the contents of the malfunction of the charging control unit 56, it is impossible to interrupt the charging power outputted from the power converter 51. Accordingly, in the charging system 10 and the electric vehicle 11 of one embodiment of the present invention, a failsafe control is executed according to the following sequence in order to switch the relays 39 and 40 to the disconnection state, without causing a weld failure or fusion failure when the charging power from the charger 12 is continuously supplied.

Figure 5:
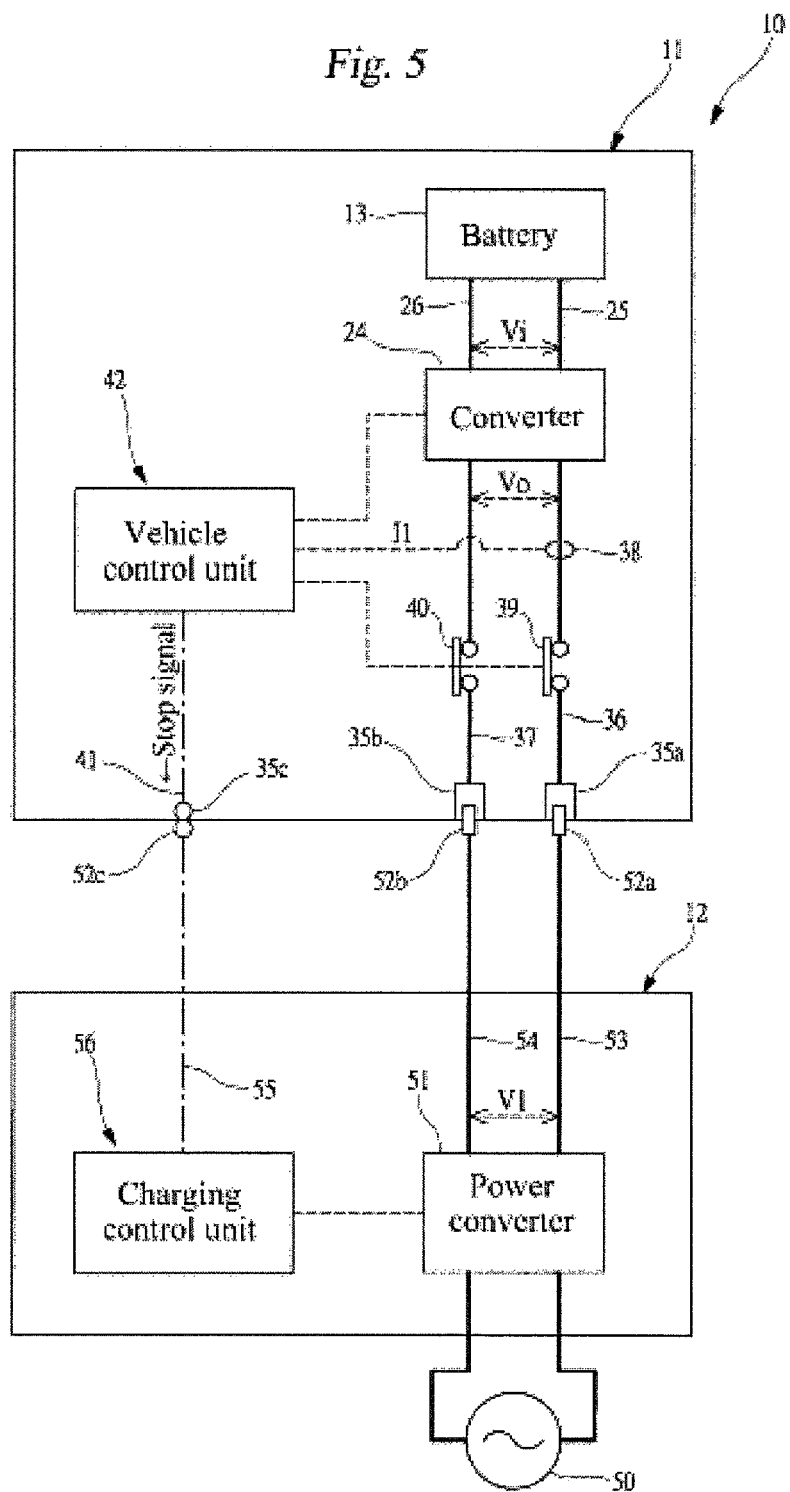
FIG. 5 is a schematic diagram illustrating main parts in the electric charging system that execute a failsafe control.
Figure 6:
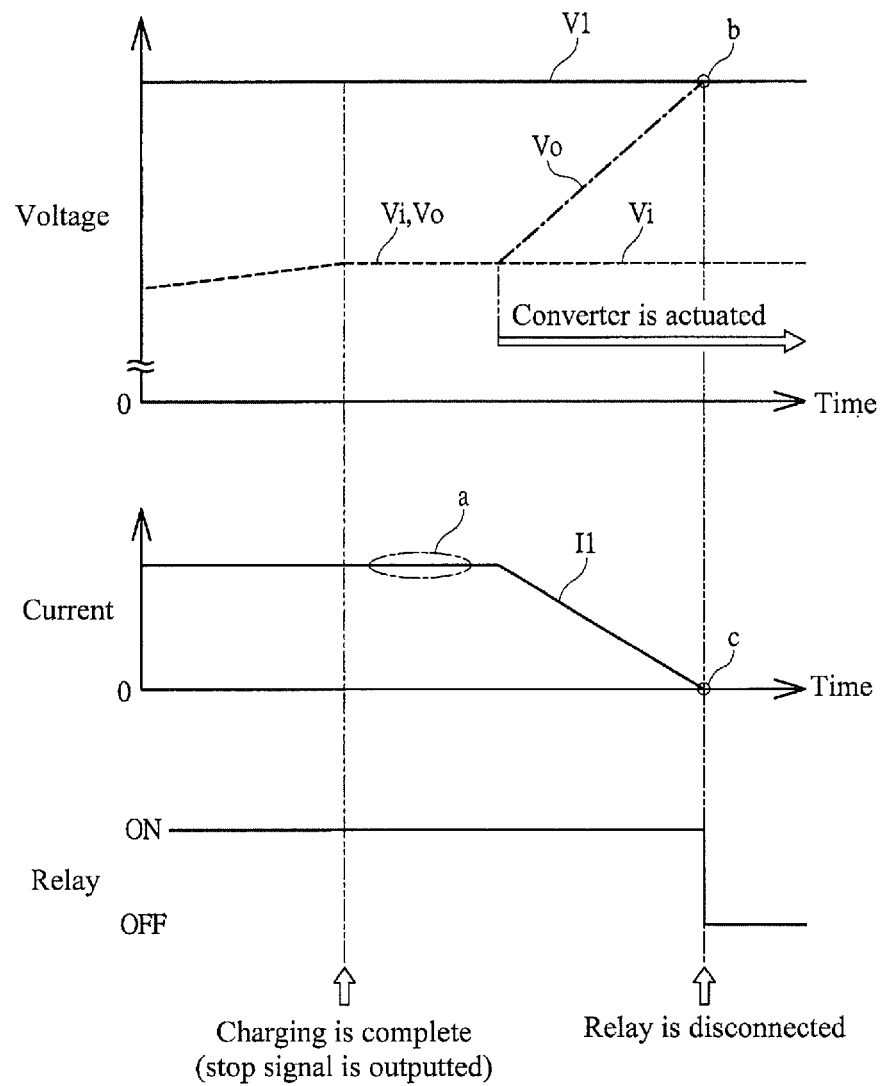
FIG. 6 is an explanatory diagram showing voltage and current variations during the execution of the failsafe control.

FIG. 5 is a schematic diagram illustrating main parts in the electric charging system 10 that executes the failsafe control. FIG. 6 is an explanatory diagram showing voltage and current variations during the execution of the failsafe control. In FIG. 5, the components identical to those shown in FIG. 4 are assigned with like reference numerals and the explanation thereof is herein omitted. As shown in FIG. 5 and FIG. 6, when the charging is complete, a stop signal is outputted from the vehicle control unit 42 to the charging control unit 56, and the charging control unit 56 receives the stop signal and stops the supply of power from the power conversion unit 51. In this case, when the electric current I1 that is equal to or greater than a predetermined value is continuously detected by the current sensor 38, as shown by the reference symbol (a) in FIG. 6, it is determined the electric charger 12 is in a fail state in which the charging power supply cannot be interrupted. Where the fail state of the electric charger 12 is thus detected, the vehicle control unit 42 that functions as a fail controller drives the converter 24 in a boost mode, thereby supplying the boosted stored power of the battery 13 to one end side of the relays 39 and 40. Thus, the electric power inputted from the battery 13 to the converter 24 at a voltage V1 is boosted by the converter 24 to the voltage V0 and then outputted to the relays 39 and 40. Then, as shown in FIG. 6, the vehicle control unit 42 switches the relays 39 and 40 from the connection state (ON) to the disconnection state (OFF), while the output voltage V0 of the converter 24 is increased, till the output voltage V1 of the electric power converter 51 is reached (reference symbol (b)), that is, till the electric current I1 flowing in the power receiving lines 36 and 37 decreases to zero (reference symbol (c)).

Thus, when the interruption of charging power supply fails, the stored electric power of the battery 13 is boosted by operating the converter 24 and supplied to the relays 39 and 40. As a result, even when the interruption of charging power supply fails, the difference in electric potential between one end side (converter side) and the other end side (power receiving connector side) of the relays 39 and 40 can be eliminated and the electric current I1 flowing in the relays 39 and 40 can be reduced to zero. Further, by switching the relays 39 and 40 to the disconnection state after the electric current I1 flowing in the relays 39 and 40 has been reduced to zero, it is possible to prevent a weld failure or fusion failure of the relays 39 and 40. In the explanation above, the electric current I1 is reduced to zero, but such a feature is not limiting, and the relays 39 and 40 may be switched to the disconnection state at a stage where the electric current I1 is less than a predetermined value, provided that no weld failure or the like occurs at such current value.

Further, since the power receiving lines 36 and 37 are connected to the electric power lines 27 and 28, the converter 24 is disposed between the relays 39, 40 and the battery 13 and also disposed between the inverter 23 and the battery 13. Thus, when the vehicle runs, the electric power from the battery 13 that has been boosted in voltage by the converter 24 can be supplied to the motor-generator 20. As a result, the electric current of the electric power supplied to the motor-generator 20 can be reduced and the inverter 23 can be miniaturized and reduced in weight. Thus, the converter 24 can be used not only when the electric charger 12 fails, but also to boost the electric power supplied to the inverter 23, and therefore the electric vehicle 11 can be provided with a failsafe function, while inhibiting the production cost.

The present invention is not limited to the above-described embodiments, and it goes without saying that various changes may be made without departing from the scope of the invention. In the explanation above, the vehicle control unit 42 functions as a fail controller, but such configuration is not limiting, and the charging control unit 56 may also function as the fail controller. Further, in the explanation above, the fail state of the electric charger 12 and the disconnection timing of the relays 39 and 40 are determined on the basis of the electric current I1 from the electric current sensor 38, but such configuration is not limiting, and the disconnection timing of the relays 39 and 40 may be also determined on the basis of the electric current flowing in the power supply lines 53 and 54, power receiving line 37, and electric power lines 25 and 26. Further, in the case illustrated by the figures, the disconnection timing of the relays 39 and 40 is determined on the basis of the electric current I1 flowing in the power receiving line 36 between the converter 24 and the relay 39, but such configuration is not limiting, and the disconnection timing of the relays 39 and 40 may be also determined on the basis of the electric current flowing in the power receiving line 36 between the relay 39 and the power receiving connector 35. Furthermore, the fail state of the electric charger 12 and the disconnection timing of the relays 39 and 40 may be also determined by using a voltage sensor that measures the output voltage V1 of the power converter 51 and the output voltage V0 of the converter 24.

Further, in the explanation above, the relays 39 and 40 are provided for both the positive electrode side and the negative electrode side of the battery 13, but the present invention can be also used when charging an electric vehicle provided with the relay 39 only on the positive electrode side of the battery 13 or an electric vehicle provided with the relay 40 only on the negative electrode side of the battery 13. From the standpoint of safety during the charging operation, it is desirable that the relays 39 and 40 be provided on both the positive elective side and the negative electrode side of the battery 13. The illustrated electric vehicle 11 is an electric vehicle which only has the motor-generator 20 for propulsion, but it may also be a hybrid-type electric vehicle that includes the motor-generator 20 and an engine for propulsion. Further, the battery 13 such as a lithium-ion secondary battery and a nickel metal hydride secondary battery is used as the electric storage device, but the present invention is not limited to such configuration. Thus, a capacitor such as a lithium-ion capacitor and an electric double layer capacitor may be used as the electric storage device.

What is claimed is:

1. An electric charging system in which an electric vehicle is provided with a power receiving connector to be connected to an electric storage device, a power supply connector of an electric charger is connected to the power receiving connector, and charging power is supplied from the electric charger to the electric storage device, the electric charging system comprising:

a relay provided between the electric storage device and the power receiving connector and switched between a connection state and a disconnection state;

a converter provided between the electric storage device and the relay and configured to boost a voltage of an electric power of the electric storage device to supply a boosted electric power to the relay; and a fail controller configured to detect a fail state of the electric charger and to drive the converter in a boost mode to supply the boosted voltage of the electric power of the electric storage device to one end side of the relay to thereby release a charging current from the electric charger, and then to switch the relay from the connection state to the disconnection state while the charging current is reduced.

2. The electric charging system according to claim 1, wherein the fail controller switches the relay to the disconnection state after an electric current in a current carrying line connecting the electric storage device to the power supply connector becomes less than a predetermined value.

3. The electric charging system according to claim 2, wherein the electric vehicle comprises an inverter for supplying electric power to an electric motor, and
wherein, when the vehicle runs, the boosted electric power is supplied from the converter to the inverter.

4. The electric charging system according to claim 1, wherein the electric vehicle comprises an inverter for supplying electric power to an electric motor, and
wherein, when the vehicle runs, the boosted electric power is supplied from the converter to the inverter.

5. The electric charging system according to claim 1, wherein, in the disconnection state, the converter is controlled such that a difference between an output voltage of the converter applied to said one end side of the relay and an output voltage of the electric charger applied to another end side of the relay is eliminated.

6. The electric charging system according to claim 5, wherein said one end side of the relay is located in a side of the converter, and said another end side of the relay is located in a side of the power receiving connector.

7. The electric charging system according to claim 1, further comprising:
an inverter for supplying power to an electric motor,
wherein the inverter is selectively connected to the electric storage device parallel to a connection of the relay to the electric storage device.

8. The electric charging system according to claim 7, wherein the inverter is selectively connected to the electric storage device independent of the relay.

9. The electric charging system according to claim 7, further comprising:
another relay provided between the converter and the inverter such that said another relay disconnects a connection between the converter and the inverter when the relay is switched to the connection state.

10. The electric charging system according to claim 1, further comprising:
an inverter for supplying power to an electric motor; and
another relay provided between the converter and the inverter such that said another relay disconnects a connection between the converter and the inverter when the relay is switched to the connection state.

11. An electric vehicle provided with a power receiving connector to be connected to an electric storage device and a power supply connector of an electric charger connected to the power receiving connector during charging, the electric vehicle comprising:
a relay provided between the electric storage device and the power receiving connector and that is switched between a connection state and a disconnection state;
a converter provided between the electric storage device and the relay and configured to boost a voltage of an electric power of the electric storage device to supply a boosted electric power to the relay; and
a fail controller configured to detect a fail state of the electric charger and to drive the converter in a boost mode to supply the boosted voltage of the electric power of the electric storage device to one end side of the relay to thereby release a charging current from the electric charger, and then to switch the relay from the connection state to the disconnection state while the charging current is reduced.

12. The electric vehicle according to claim 11, wherein the fail controller switches the relay to the disconnection state after an electric current in a current carrying line connecting the electric storage device to the power supply connector becomes less than a predetermined value.

13. The electric vehicle according to claim 12, wherein the electric vehicle comprises an inverter for supplying electric power to an electric motor, and
wherein, when the vehicle runs, the boosted electric power is supplied from the converter to the inverter.

14. The electric vehicle according to claim 11, wherein the electric vehicle comprises an inverter for supplying electric power to an electric motor, and
wherein, when the vehicle runs, the boosted electric power is supplied from the converter to the inverter.

15. The electric vehicle according to claim 11, wherein, in the disconnection state, the converter is controlled such that a difference between an output voltage of the converter applied to said one end side of the relay and an output voltage of the electric charger applied to another end side of the relay is eliminated.

16. The electric vehicle according to claim 15, wherein said one end side of the relay is located in a side of the converter, and said another end side of the relay is located in a side of the power receiving connector.

17. The electric vehicle according to claim 11, further comprising:
an inverter for supplying power to an electric motor,
wherein the inverter is selectively connected to the electric storage device parallel to a connection of the relay to the electric storage device.

18. The electric vehicle according to claim 17, further comprising:
another relay provided between the converter and the inverter such that said another relay disconnects a connection between the converter and the inverter when the relay is switched to the connection state.

19. The electric vehicle according to claim 11, further comprising:
an inverter for supplying power to an electric motor; and
another relay provided between the converter and the inverter such that said another relay disconnects a connection between the converter and the inverter when the relay is switched to the connection state.

20. An electric vehicle, comprising:
an electric storage device;
a power receiving connector to be connected to the electric storage device;
a relay provided between the electric storage device and the power receiving connector and being switched between a connection state and a disconnection state;
a converter provided between the electric storage device and the relay; and
a vehicle control unit configured to operate the relay and the converter,
wherein, when a fail state of a electric charger is detected, the vehicle control unit is configured to drive the converter in a boost mode to supply a boosted voltage of the electric power of the electric storage device to one end side of the relay to thereby release a charging current from the electric charger, and then to switch the relay from the connection state to the disconnection state while the charging current is reduced.

\* \* \* \* \*